June 2, 1942.                J. B. TIEDEMANN                2,284,851
                          ELECTRIC WELDING MACHINE
                     Filed Feb. 5, 1937          5 Sheets-Sheet 1
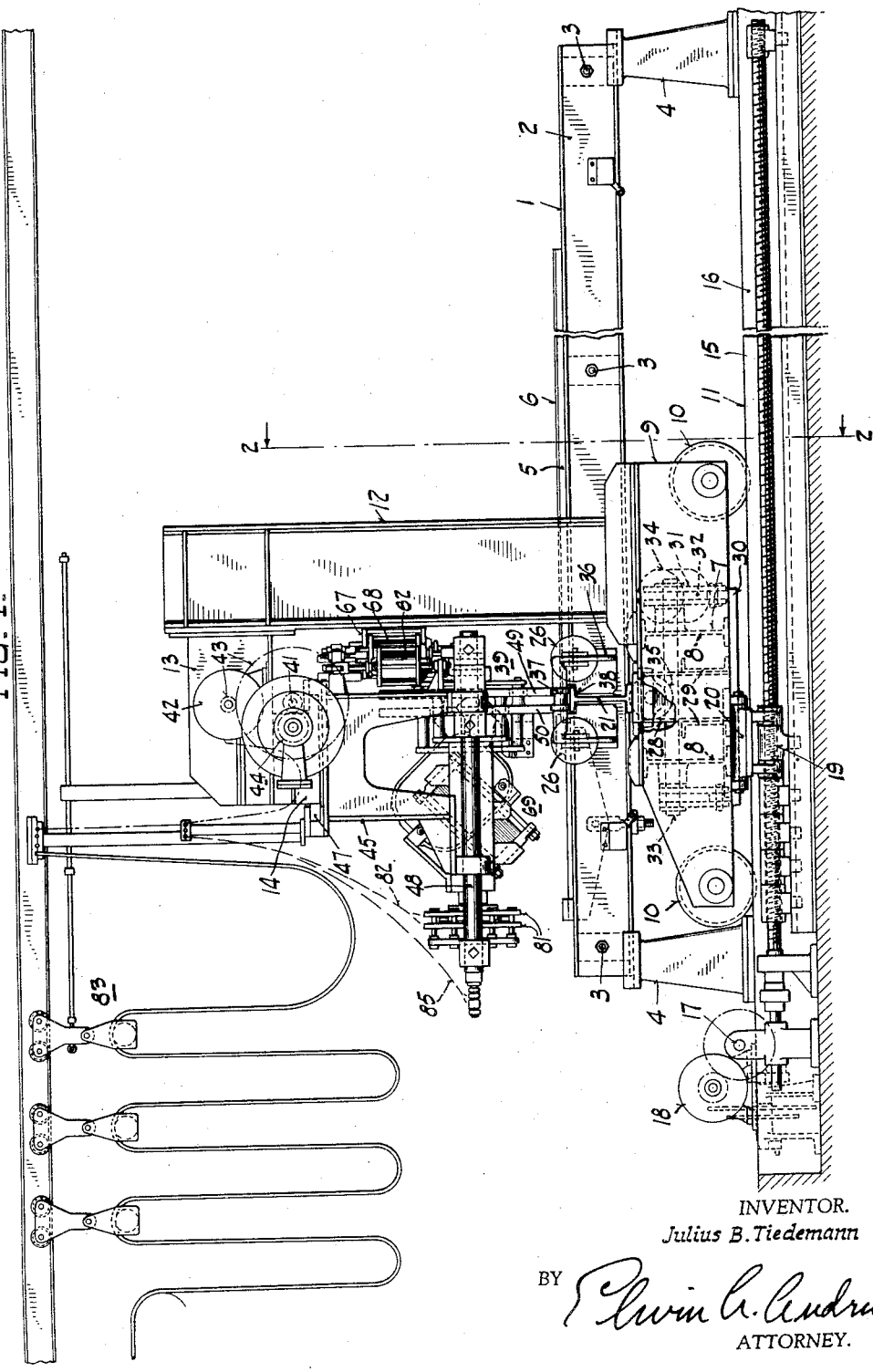
INVENTOR.
Julius B. Tiedemann
BY
ATTORNEY.

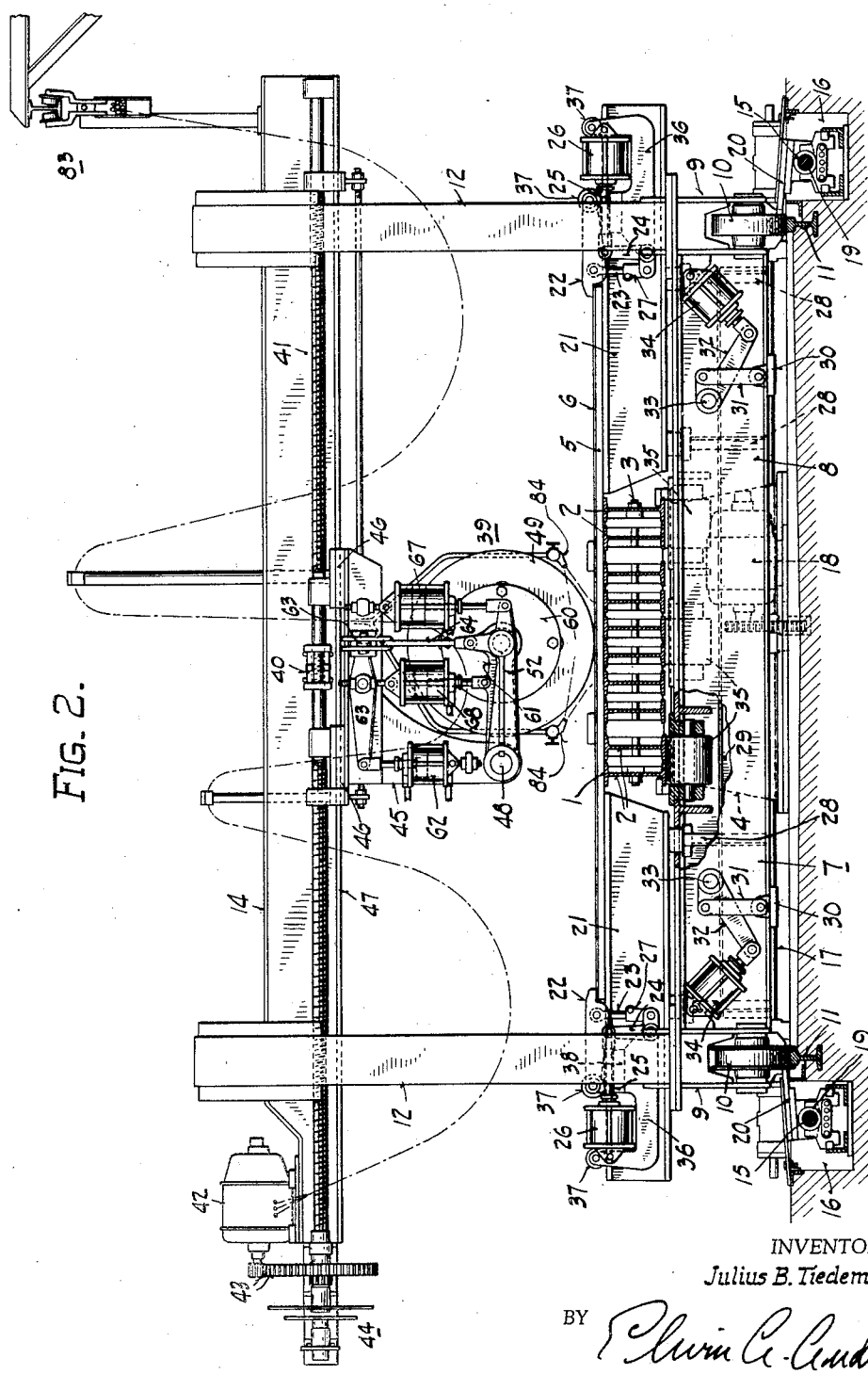

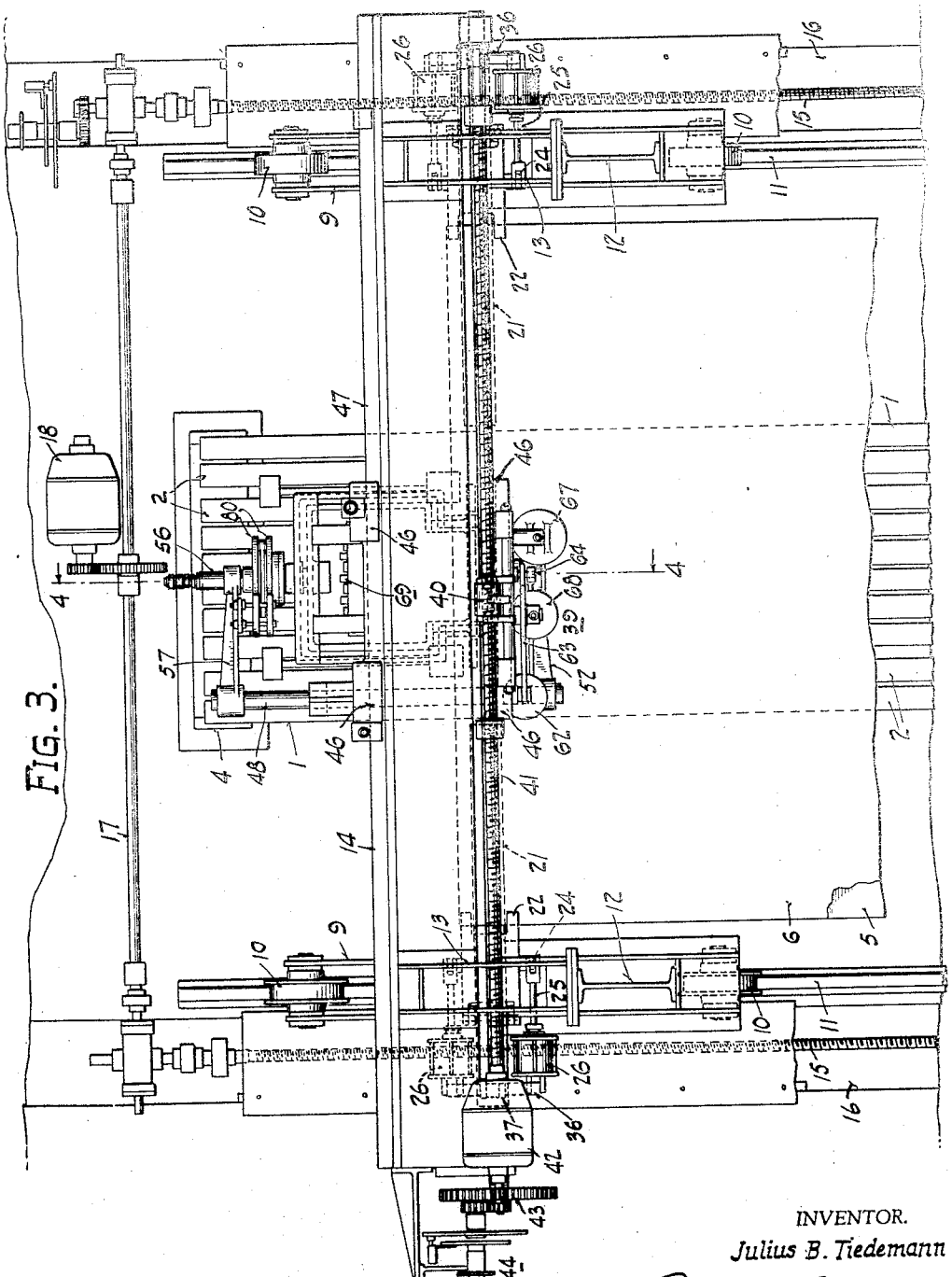

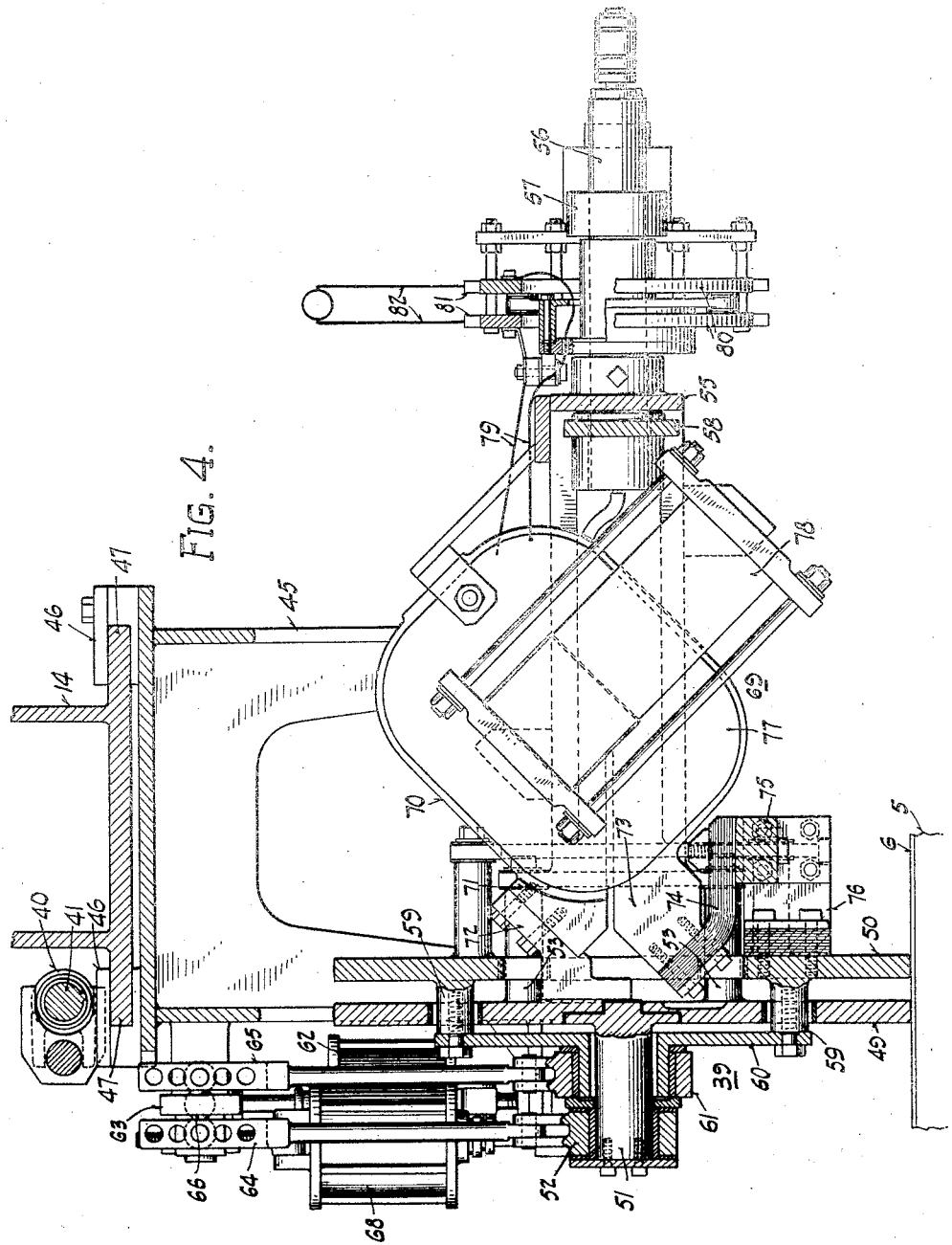

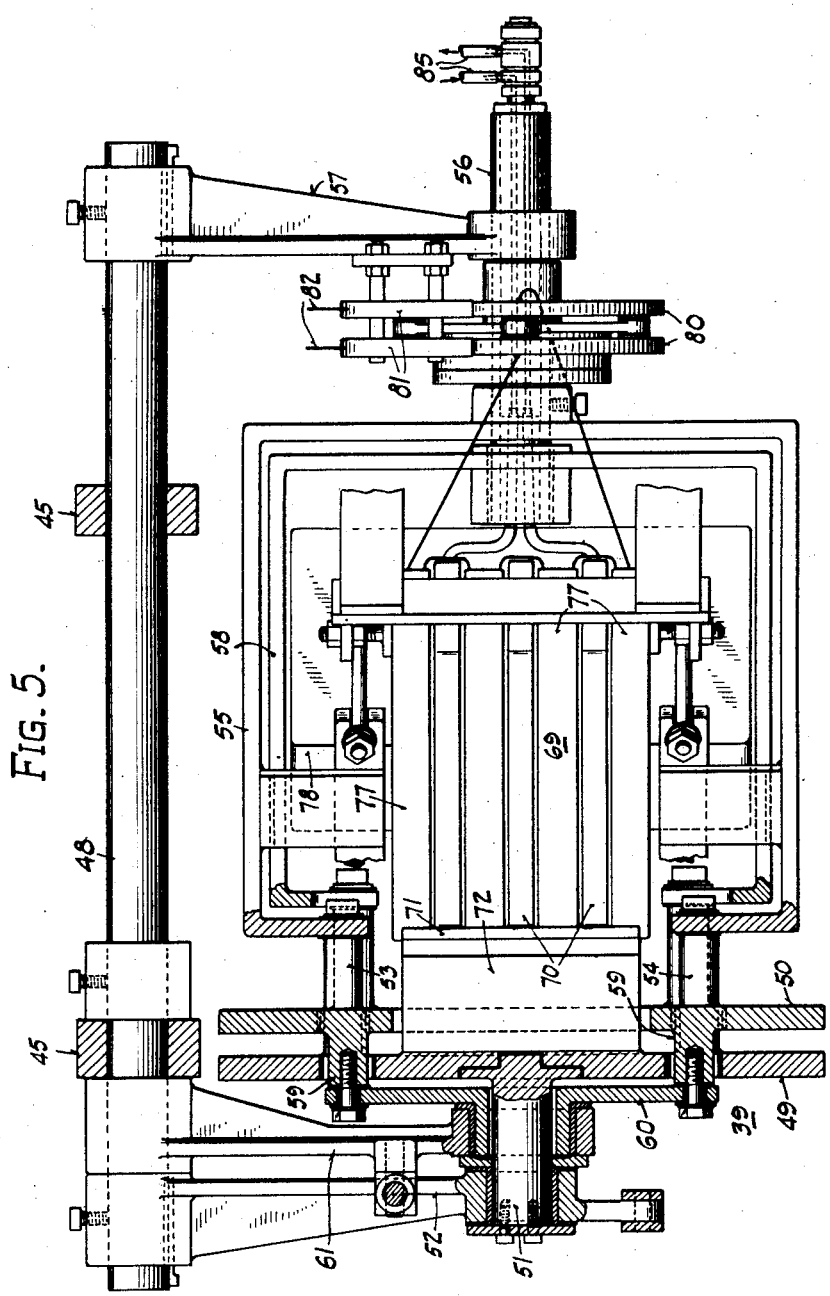

Patented June 2, 1942

2,284,851

UNITED STATES PATENT OFFICE 2,284,851

ELECTRIC WELDING MACHINE

Julius B. Tiedemann, Milwaukee, Wis., assignor to A. O. Smith Corporation, Milwaukee, Wis., a corporation of New York Application February 5, 1937, Serial No. 124,171

18 Claims. (Cl. 219—4)

The invention relates to an electric welding machine. It has been specifically applied in the spot welding of alloy lining sheets to pressure vessels as set forth in U. S. Letters Patent No. 1,840,305, issued to O. E. Andrus and Sune Hermanson.

The object of the invention is to provide a machine which will weld the liner sheet at close spots or lines to a thick plate preparatory to fabricating a lined vessel.

Another object is to provide novel means of effecting two welds simultaneously from the same side of the plates being welded.

Another object is to provide a multiple resistance spot welder utilizing roller electrodes and in which the work is supported beneath the electrodes instead of between them.

Another object is to provide an efficient construction of roller electrodes with a welding transformer adjacent thereto and attached to rotate therewith.

Other objects will appear hereinafter in connection with the description of the preferred embodiment illustrated in the accompanying drawings. In the drawings:

Figure 1 is a side elevation of the machine;

Figure 2 is a transverse section taken on line 2—2 of Figure 1;

Figure 3 is a top plan view of one end of the machine;

Figure 4 is an enlarged section taken on line 4—4 of Figure 3 through the electrodes and transformer; and Figure 5 is an enlarged plan view showing the electrode mounting.

The welding machine comprises, in general, a work supporting table, a welding head, and a carriage for holding and moving the welding head.

The work supporting table comprises a horizontal table top 1, preferably consisting of a plurality of parallel I-beams 2 extending longitudinally and bolted together in spaced relation by bolts 3 passing through their vertical webs. The beams 2 are supported at their ends by legs 4. In practice, the steel plate 5, being of suitable dimensions for subsequent forming into part of the shell of a pressure vessel, is laid upon the top of the beams 2. The liner sheet 6, of suitable corrosion-resistant alloy, is laid on top of the plate 5 and positioned for welding to the latter.

The carriage comprises a base 7 composed of two transverse I-beams 8 extending beneath the table top 1 and joined to a frame 9 at each end. The frames 9 are supported by rollers 10 on the tracks 11 to permit movement of the carriage longitudinally of the table. Each frame 9 supports a vertical column 12 extending upwardly at one side of the beams 8. The columns 12 carry arms 13 extending over the I-beams 8. A beam 14 extends across the table and is supported by the arms 13. The welding head is mounted on the beam 14 for transverse movement across the table.

The movement of the carriage longitudinally of the table is effected by means of the screw shafts 15 adjacent the tracks 11. The screw shafts are mounted in a covered trough 16 in the floor and are driven by means of the cross shaft 17 connected by suitable gearing to the motor 18. A nut 19 is threaded on each screw shaft 15 and engages an arm 20 pivoted to the frame 9 to effect movement of the latter by rotation of the shaft 15.

The carriage base 7 is provided with clamping mechanism for holding the plates 5 and 6 in position and for supporting the table 1 and parts 5 and 6 against the electrode pressure.

The clamping mechanism for preventing relative movement between the plates 5 and 6 and the carriage base 7 during welding comprises an I-beam 21 supported on the base 7 as hereinafter described and extending transversely in the plane of the table top 1 on either side thereof. A pivotal jaw member 22 is provided for vertical movement to clamp the plates 5 and 6 to the top of each beam 21. The jaw members 22 are operated through pull rods 23 extending downwardly therefrom to one end of the bell crank levers 24. The other ends of the bell crank levers 24 are connected to the end of piston rods 25 of air cylinders 26. Where the thickness of plates 5 and 6 vary beyond the limits provided for by the stroke of the pistons of cylinders 26, the rods 23 may be adjusted to different lengths by adjustment of the telescoping parts of the rods 23 as shown at 27.

The I-beams 21 are supported by upright channel posts 28 which connect the transverse channels 29 arranged between the I-beams 8 of the carriage and extending between the frames 9. The channels 29 are supported on plates 30 extending beneath the beams 8 of the carriage base 7. The plates 30 are hung on links 31 from bell crank levers 32 and are adapted for limited vertical movement responsive to movement of the bell crank levers. The bell crank levers 32 are secured to a shaft 33 extending through the webs of beams 8 above the channels 29. One of the bell crank levers 32 at each end of the base 7 is connected to the piston of an air cylinder 34 for operating the lever to raise and lower the channels 29.

Beams 8 support a series of aligned rollers 35 engaging the bottoms of beams 2 of the table top and adapted to support the beams intermediate their ends. To align the beams 21 with the top of table 1 the upward movement of beams 21 is limited by plates 30 engaging the bottoms of beams 8.

The clamping jaws 22 are movable along the beams 21 to accommodate plates of different widths. For this purpose the cylinders 26 are mounted on a frame 36 hung from rollers 37 riding on the top of beams 21 and having projections 38 extending beneath the upper flanges of the beams for holding the cylinders during clamping. The bell crank levers 24 are pivoted to the respective frames 36 on either side of the beams 21.

The welding head 39 is preferably of the resistance welding type, although it may be of the arc welding type. The head shown in the drawings is for resistance welding and preferably for resistance spot welding, although it may be used to produce resistance line welds. The head is carried on the beam 14 for transverse movement across the plates 5 and 6. The head is moved along the beam 14 by means of the nut 40 on the screw shaft 41, the shaft 41 being rotated by means of motor 42, gearing 43 and feed control mechanism 44 mounted on the end of beam 14.

The nut 40 is pivotally mounted on a frame 45 of the head to prevent binding of the nut in case of relative vertical movement between the head and shaft 41. The frame 45 is of inverted U-shape and is slidably mounted beneath the beam 14 on slide bearings 46, which engage the lower flanges 47 of the beam. The lower ends of the legs of the frame carry a pivotal shaft 48.

The electrodes for the welding machine consist of two copper rollers 49 and 50 arranged side by side and adapted to press against the plate 6 to effect spot welding of the same to plate 5. The rollers 49 and 50 are mounted for limited relative vertical movement to allow for uneven surface of the work and to provide for equalizing the pressure of the electrode contacts.

Referring to Figure 5, the electrode 49 is mounted on a stub axle 51 rotating in a bearing at the end of the horizontal arm 52. The arm 52 is keyed at its other end to shaft 48. The electrode 49 has two rearwardly extending projections 53 and 54 near its outer circumference. The projections 53 and 54 are secured to a frame 55 which is secured on a second stub axle 56. The axle 56 is rotatably mounted in a bearing at the end of a second horizontal arm 57 which has its other end keyed to the shaft 48.

The electrode 50 is secured to a frame 58 which is pivotally mounted on the inner end of the stub axle 56 in a manner permitting the limited vertical movement of the electrode. The electrode 50 has openings for receiving the projections 53 and 54 on electrode 49. Likewise, electrode 50 has projections 59 extending through openings in electrode 49 and secured to a disk 60 journaled in arm 61 substantially concentric with the stub axle 51, which projects loosely therethrough. The other end of the arm 61 is supported on shaft 48. The several parts for mounting the electrodes are insulated from each other as illustrated to prevent short circuiting of the welding current applied to the electrodes.

The electrodes are pressed against the work and lifted therefrom by means of an air cylinder 62 mounted on the frame 45 with its piston linked to one end of a horizontal lever 63 pivoted on the frame. The other end of lever 63 passes between two vertical links 64 and 65 and is connected to them by means of the pivotal cross head 66 for equalizing the pressure applied to the links 64 and 65 by the lever 63 and at the same time allowing a limited relative vertical movement of the links 64 and 65. Link 64 is adapted to bear downwardly on the stub axle 51 to press the electrode 49 against the work, while link 65 is adapted to bear downwardly on a bearing on disk 60 to press the electrode 50 against the work. The working pressures of the electrodes 49 and 50 are maintained substantially equal by means of the cross head 66.

The electrodes 49 and 50 are substantially balanced at a predetermined weight by means of two air cylinders 67 and 68, respectively. The cylinder 67 has its piston secured to the outer end of arm 52 to provide a counterbalance effect upon the electrode 49 and its associated parts while cylinder 68 has its piston secured to the auxiliary arm 61 to provide a counterbalance effect upon the electrode 50 and its associated parts. The result is to equalize the weights of the two electrodes so that when they are pressed against the work by cylinder 62 the pressure of each electrode is substantially equal to that of the other electrode. This compensates for the weight of the transformer on electrode 49.

The transformer 69 for supplying the welding current is mounted on the electrode 49 and the frame 55 and is of any suitable design for welding. The secondary 70 of the transformer is tilted, as illustrated, and has one terminal 71 bolted directly to a bracket 72 on the electrode 49. The other terminal 73 of the transformer is connected to the electrode by means of a universal joint to allow relative movement between the electrodes. For this purpose, a flexible lead 74 is bolted to the terminal 73 and the other end of lead 74 is bolted to a terminal block 75. The terminal block 75 is disposed between the ends of a flexible U-shaped lead 76 which is bolted thereto. The central portion of the lead 76 is bolted to the electrode 50. The directions of flexibility or bending of leads 74 and 76 are at right angles, thereby allowing the desired relative movement between electrodes 49 and 50 at all points of rotation.

The secondary 70 of the transformer 69 is composed of an integral member having sections disposed between coils of the primary winding 77. Both the secondary 70 and the primary 77 pass through a core 78.

The primary 77 is connected to a suitable source of electricity by means of the leads 79, rotating contact wheels 80, stationary contact blocks 81, and leads 82. The leads 82 are supported in loops from the trolley 83 to allow for longitudinal and lateral movement of the head along the work.

The electrodes 49 and 50, as well as the work, are kept cool by means of water directed from nozzles 84 adjacent the electrodes. Water is also circulated through ducts in the secondary 70 from the hose connection 85 at the end of the axle 56. Various embodiments of the invention may be employed within the scope of the accompanying claims.

I claim:

1. In an electric resistance welding machine, a plurality of electrodes for contacting with the work on one side thereof, and means for moving the electrodes relative to one another within the tolerances as to unevenness of the work piece to effect substantially equal pressure engagement of the electrodes with the work.

2. In an electric resistance welding machine, a plurality of electrodes for contacting with the work on one side thereof, a frame for holding said electrodes in fixed relation, and means for moving the electrodes relative to one another to compensate for unevenness of the work and maintain substantially equal pressure contact between the electrodes and the work.

3. In an electric resistance welding machine, a pair of electrodes for contacting with the work on one side thereof, a source of welding current connected to said electrodes, means for pressing said electrodes against the work, and means for equalizing the pressure contact of said electrodes with the work, said equalizing means allowing relative movement of the electrodes caused by unevenness of the work as the electrodes are moved relatively to the work.

4. In an electric resistance welding machine, a pair of electrodes for contacting with the work on one side thereof, said electrodes being connected in series through the work, and pressure cylinders for equalizing the pressure contact of the electrodes against the work within limits of unevenness of the work during movement of the electrodes.

5. In an electric resistance welding machine, a pair of insulated roller electrodes for contacting with the work on one side thereof, said electrodes being side by side and being connected to a common rotary shaft at a distance to one side of said electrodes and substantially co-axial therewith, and means at the other side of said electrodes for applying an equalized pressure thereto to effect contact of the electrodes with the work within limits of unevenness of the latter.

6. In an electric resistance welding machine, a pair of insulated roller electrodes for contacting with the work on one side thereof, said electrodes being side by side and being connected to a common rotary shaft at a distance to one side of said electrodes and substantially co-axial therewith, and means at the other side of said electrodes for applying an equalized pressure thereto to effect contact of the electrodes with the work within limits of unevenness of the latter, the connection of one electrode with the shaft being made by means passing through an opening in the other electrode and the connection of the opposite electrode with the pressure applying means being made by means passing through an opening in the other electrode.

7. In a welding machine, a pair of roller electrodes arranged side by side and substantially concentric, and a transformer mounted rigidly with respect to one of said electrodes, one lead of the secondary of said transformer being secured directly to said electrode and the other lead of said secondary being flexible universally and connected to the other electrode to allow limited movement of the latter relative to the first electrode.

8. In a welding machine, a pair of roller electrodes arranged side by side and substantially concentric, and a transformer mounted rigidly with respect to one of said electrodes, one lead of the secondary of said transformer being secured directly to said electrode and the other lead of said secondary being flexible universally and connected to the other electrode to allow limited movement of the latter relative to the first electrode, the flexible lead of said secondary being constructed of at least two separate lengths of laminated conducting material disposed angularly to each other and connected in series through an intermediate block to allow relative movement between the transformer and the electrode in more than one direction, the electrodes and transformer being adapted to rotate simultaneously.

9. In a machine for electrically welding alloy liners to steel plates, a table for supporting the work, a frame movable longitudinally of the table and having a beam extending transversely over the table, a welding head mounted on said beam for transverse movement across said table, a pair of roller electrodes on said head for welding contact with the work, means for moving the frame longitudinally of the work a predetermined amount, means on the frame for clamping the work and preventing further movement of the frame, means for lowering said electrodes and pressing the same against the work, means for traversing the electrodes over the work in a transverse direction and applying the welding current to the electrodes, means to raise the electrodes from the work, and means to release said clamping means, said machine being adapted to repeat the movement of the frame clamps, welding head and electrodes in a plurality of cycles until the alloy liner is substantially welded to the plate.

10. In a welding machine, a support for materials to be welded, a carriage above and spaced apart from said support, means supporting said carriage for movement in a horizontal direction, a welding circuit mounted on said carriage and including a transformer secondary and a pair of contact members connected to said secondary, at least one of said connections being flexible, and means on the carriage to move said contact members from and toward said support.

11. In a welding machine, a support for materials to be welded, a carriage above said support, means supporting said carriage for movement in a horizontal direction, a welding circuit on said carriage terminating in contact members movable relative to each other, and a fluid pressure actuator on said carriage supporting said contact members and adapted to move them up and down on said carriage.

12. A welding machine, a work support for materials to be welded, a carriage above said support and movable in a horizontal direction, a pair of contact members, fluid pressure means mounted on said carriage and serving to support said contact members and move them from and toward said work support, a transformer mounted on said carriage, and short leads connecting said transformer secondary to said contact members, at least one of said leads being flexible.

13. In a welding machine, a support for materials to be welded, a carriage above and spaced apart from said support, a welding circuit mounted on said carriage and terminating in contact members movable relative to each other, and fluid pressure responsive means on the carriage supporting and serving to raise and lower said contact members.

14. In a welding machine, a support for materials to be welded, a carriage above and spaced apart from said support, means supporting said carriage for movements relative to said support in a horizontal direction, a welding circuit mounted on said carriage and consisting of a transformer secondary, a pair of contact members and short flexible connections between said secondary and at least one of said members, and means on the carriage to move said contact members from and towards said support.

15. In a welding machine, a support for materials to be welded, a carriage above said support, means supporting said carriage for movement relative to said support in a horizontal direction, a welding circuit on said carriage terminating in contact members movable relative to each other, and fluid pressure means on said carriage supporting said contact members and adapted to move them up and down on said carriage.

16. In a welding machine, a work support for materials to be welded, a carriage above said support and movable relative to the same in the horizontal direction, a pair of contact members, fluid pressure means mounted on said carriage and serving to support said contact members and move them from and towards said work support, a transformer mounted on said carriage, and short flexible leads connecting said transformer secondary to at least one of said contact members.

17. In a welding machine, a work support for materials to be welded, a carriage above said support and movable relative to the same in the horizontal direction, a pair of contact members, fluid pressure means mounted on said carriage and serving to support said contact members and move them from and toward said work support, a transformer mounted on said carriage, and short flexible leads connecting said transformer secondary to at least one of said contact members.

18. In a machine of the class described, a work support, a carriage above said support and movable thereover, a pair of welding electrodes and a transformer secured directly to the electrodes to supply welding current thereto, an arm disposed substantially horizontal and pivoted to the carriage to effect travel of said electrodes and transformer with said carriage, and means on said carriage to raise and lower said electrodes and effect a predetermined electrode pressure on the work on said support.

JULIUS B. TIEDEMANN.